United States Patent [19]
Bolland

[11] Patent Number: 4,834,199
[45] Date of Patent: May 30, 1989

[54] WEIGHT SENSING APPARATUS

[76] Inventor: George B. Bolland, 42 Home Farm Crescent, Whitnash, Leamington Spa, Warwickshire, United Kingdom

[21] Appl. No.: 144,010

[22] Filed: Jan. 15, 1988

[51] Int. Cl.⁴ .................. G01G 19/04; G01G 3/14; G01L 1/22
[52] U.S. Cl. .................. 177/163; 177/211; 73/862.66
[58] Field of Search .............. 177/163, 211; 73/862.66

[56] References Cited

U.S. PATENT DOCUMENTS

| | | | |
|---|---|---|---|
| 3,155,184 | 11/1964 | Raskin | 177/211 X |
| 3,448,424 | 6/1969 | Laimins . | |
| 3,734,216 | 5/1973 | Nordstrom et al. | 177/211 X |
| 3,741,327 | 6/1973 | Nordstrom et al. . | |
| 4,516,646 | 5/1985 | Bergfalk | 177/211 |
| 4,549,622 | 10/1985 | Leiman | 177/211 X |
| 4,744,254 | 5/1988 | Barten | 177/211 X |

FOREIGN PATENT DOCUMENTS

| | | |
|---|---|---|
| 587473 | 4/1977 | Switzerland . |
| 1291827 | 2/1987 | U.S.S.R. . |
| 1421182 | 1/1976 | United Kingdom . |

OTHER PUBLICATIONS

Patent Abstracts of Japan, vol. 7, No. 93, [JP-A-5819515]: 2/1983.

*Primary Examiner*—George H. Miller, Jr.
*Attorney, Agent, or Firm*—Marks Murase & White

[57] ABSTRACT

A weight sensing apparatus comprising first and second support means, a load carrying member supported on said first and second support means, a sensing portion of the load carrying member which terminates inwardly of at least one end of the load carrying member and being disposed between said support means and therebeing at least one further portion of the load carrying member which extends away from said sensing portion beyond an adjacent one of said first and second support means towards an end of the load carrying member, a load receiving region provided on said sensing portion, at least one strain gauge positioned on the sensing portion to sense the strain in said member to provide a signal indicative of load applied to the load receiving region, said at least one strain gauge being positioned between the support means at a distance from at least one of the first support means, the second support means and the load receiving means, which is not greater than a distance d max., where d max. is the maximum thickness of the member between the first and second support means in the direction in which the load is to be applied.

10 Claims, 4 Drawing Sheets

WEIGHT SENSING APPARATUS

This invention relates to a weight sensing apparatus.

According to one aspect of the invention I provide a weight sensing apparatus comprising first and second support means, a load carrying member supported on said first and second support means, a sensing portion of the load carrying member which terminates inwardly of at least one end of the load carrying member and being disposed between said support means and therebeing at least one further portion of the load carrying member which extends away from said sensing portion beyond an adjacent one of said first and second support means towards an end of the load carrying member, a load receiving region provided on said sensing portion, at least one strain gauge positioned on the sensing portion to sense the strain in said member to provide a signal indicative of load applied to the load receiving region, said at least one strain gauge being positioned between the support means at a distance from at least one of the first support means, the second support means and the load receiving means, which is not greater than a distance d max., when d max. is the maximum thickness of the member between the first and second support means in the direction in which the load is to be applied.

It is established in theory that to measure strain in a beam using a strain gauge, the strain gauge needs to be positioned further from the applied load and the support means than the distance d max, because closer to the load or either of the support means than distance d max. the strain is not symmetrically distributed through the beam and hence false readings can occur. However it has been found that a practical weight sensing apparatus can use a strain gauge at or closer than distance d max. to the support means or the load because at least at a mid point of the thickness of the beam, the strain in the beam is approximately constant even at distances closer to the support means or the applied load than said distance d max., even though the strain is otherwise not symmetrically distributed through the beam.

For greatest accuracy, the strain gauge is provided intermediate a top and bottom of the member, preferably approximately mid-way, and the load is applied to the top of the member.

Preferably, the strain gauge is not positioned closer to a support means or the applied load than a distance of d min, when d min. is 0.35 d max.

At closer distances to a support means or the load it has been found that the weight sensing apparatus becomes unreliable.

However it may be possible to position the strain gauge closer than 0.35 d max. depending on the shape of the member. For example, down to 0.25 d max.

Preferably therefore, the strain gauge is positioned between the first and second support means at a distance from the support means or the load, in the range d max. to d min. where d min. is not greater than 0.35 d max.

A pair of strain gauges may be used spaced from one another, either side of the applied load. Preferably each of the strain gauges are positioned relative to a respective one of the support means or the applied load at a distance not greater than d max. and not closer than a distance of 0.25 to 0.35 lying in the range d max.

The or each strain gauge may comprise a plurality of strain gauge elements at least some of which are in different orientations to others, to detect strains, for example shear strains, in the member in different directions.

Thus the or each strain gauge may comprise what is known as a strain gauge rosette, having at least two strain gauge elements arranged to detect shear or other strain in the member in relative transverse directions. Where two strain gauge elements are provided, preferably these are both arranged to detect strains in the member at a direction transverse to the longitudinal axis of the member and transverse to the direction of applied load.

The strain gauge or gauges, or each of the strain gauge elements may be connected in an electrical bridge circuit which detects changes in resistance of the strain gauge, gauges, or strain gauge elements, as the load is applied to the member.

To increase the accuracy of the weight sensing apparatus, if desired, a strain gauge or strain gauges may be positioned on both sides of the member, and the average strain on both sides of the member sensed.

The invention is particularly applicable to an apparatus for sensing a wheel load of a railway guided vehicle such as a train, in which case the member may comprise a rail of the track which spans continuously between and is supported on at last three sleepers.

Particularly with railways, the rails are supported along their length by many sleepers and two consecutive sleepers may provide the first and second support means.

In order that the track can support the weight of a train, sleepers are generally not spaced further apart than about 600 mm, and the rails are typically about 150 mm thick (deep).

In order to use a pair of strain gauges in a conventional manner, it would be necessary to ensure that the wheel load is applied exactly half way between the sleepers so that each strain gauge is more than 150 mm (d max) from the applied load and from the sleepers. It will be appreciated that it is difficult to position a wheel of a train so exactly, and hence strain gauges have not hitherto been used to sense the weight of tracked vehicles.

According to a second aspect of the invention I provide a weight sensing apparatus for sensing the weight of a railway guided vehicle, the apparatus comprising at least one strain gauge adapted to be secured to a rail of the track which spans continuously between and is supported on at least three sleepers.

According to a third aspect of the invention I provide a method of sensing the weight of a railway guided vehicle, comprising securing at least one strain gauge to a side of a rail of the track, which spans continuously between and is supported on at least three sleepers, at a distance not greater than d max. from first and second consecutive sleepers, where d max. is the maximum depth of the rail between the consecutive sleepers, and connecting said at least one strain gauge in an electrical circuit.

Preferably the or each strain gauge is not positioned closer to the, or either of the, sleepers than a distance of of d min. when d min. is 0.25 to 0.35 d max. The or each strain gauge may be positioned at a location generally mid way between a top of the rail on which in use a wheel of the vehicle runs, and a bottom of the rail, parts of which bear on the sleepers.

The weight sensing apparatus for use in a method in accordance with the third aspect of the invention may have any of the features of the weight sensing apparatus in accordance with the first aspect of the invention.

It will be appreciated that because in a method in accordance with the third aspect of the invention the strain gauge or gauges may be positioned closer to the sleepers than hitherto thought possible, the position of the wheel, the weight of which is to be sensed between the sleepers, is not so critical as it would be if the strain gauge or gauges were used conventionally.

By suitable calibration of the weight sensing apparatus, the method may be used to actually determine the static or moving wheel load, although by using suitable logic and auxiliary electrical control means, the system may be used to detect for examples, the speed of a railway guided vehicle, the direction in which the vehicle is travelling, or simply the presence of a said vehicle. Further, the distance between successive axles of a railway guided vehicle can be determined to give an indication as to the type of vehicle passing over the weight sensing apparatus.

To facilitate the system being used for all these operations, preferably a second rail of the track also has one or more, preferably two, strain gauges, again positioned in accordance with the method of the third aspect of the invention.

The respective strain gauges of the two rails may be aligned, but preferably are displaced relative to one another, longitudinally of the rails.

The electrical circuit to which all of the strain gauges or strain gauge elements are connected, may include an analogue to digital converter, so that the output from the various strain gauges or strain gauge elements of the apparatus may be fed directly to a computer.

According to a fourth aspect of the invention I provide a method of sensing the weight of a load to be imposed on a load receiving region of a load carrying member which is supported, in use, on first and second support means, with the load receiving region disposed between said support means, comprising the steps of determining the maximum thickness, d max., of the member between the support means, measuring a distance from at least one of the first support means, the second support means and the load receiving region equal to d max. and positioning a strain gauge on said member between said support means at a distance therefrom which is not greater than said measured distance d max., and connecting the strain gauge in an electrical circuit to provide, in use, an indication of a load applied to the load receiving region.

The load carrying member may be supported in situ on said first and second support means and the strain gauge may be positioned on said member whilst the load carrying member remains in situ.

The invention will now be described with the aid of the accompanying drawings in which.

Figure 1:
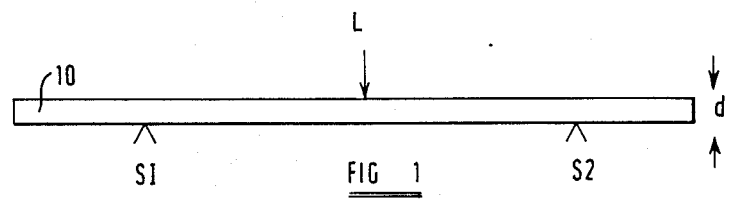
FIG. 1 is a diagrammatic view of a beam with a load applied.

Referring first to FIG. 1, a beam 10 is shown with a load L imposed upon it. The beam 10 is supported between a first support means SI and a second support means S2, and the load L is imposed between the support means S1 and S2.

Figure 2A:
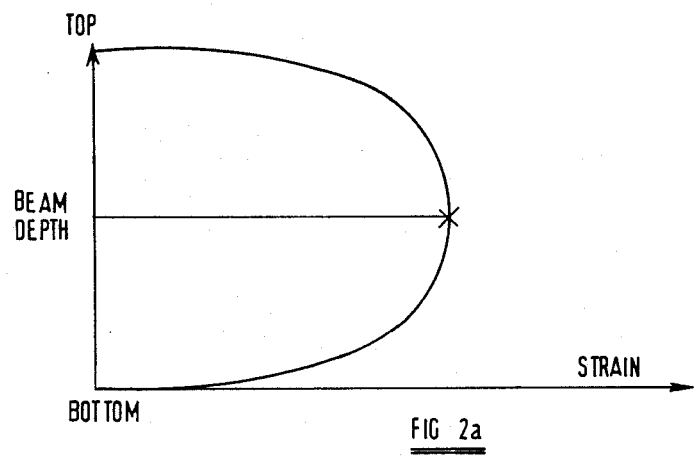
FIG. 2a is a graph showing how shear strain varies throughout the depth of a beam as measured by a strain gauge positioned remote from the load.

By using one or more strain gauges at different positions of the depth of the beam to determine how the shear strain caused by the applied load L, is distributed through the beam 10, a graph such as that shown in FIG. 2a can be produced, provided that the strain gauge is always positioned remote from the load L, and from the support means S1 and S2.

It is established in theory that provided the strain gauge is not positioned longitudinally of the beam closer to the load L or either of the support means S1,S2 than a distance d equal to the depth or maximum depth of the beam 10, then the shear strain will be distributed symmetrically through the beam as indicated by the graph in FIG. 2a.

Figure 2B:
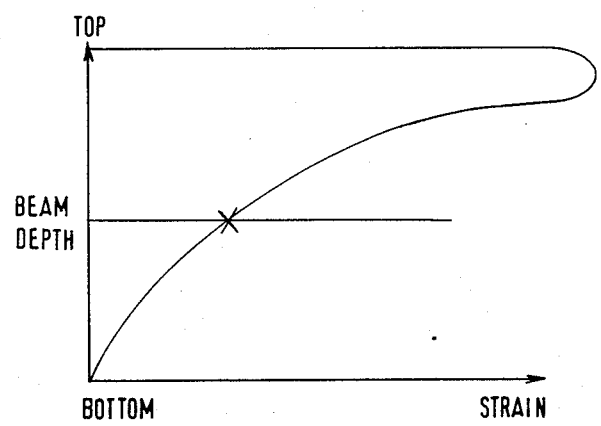
FIG. 2b is a graph similar to FIG. 2a but showing how the shear strain varies throughout the beam depth as measured by a strain gauge positioned close to the load.

If however a strain gauge is positioned longitudinally of the beam closer to the load L or to either of the support means S1 and S2 than the distance d, the load is not distributed symmetrically through the beam 10. Rather, a graph such as shown in FIG. 2b can be produced.

Figure 3:
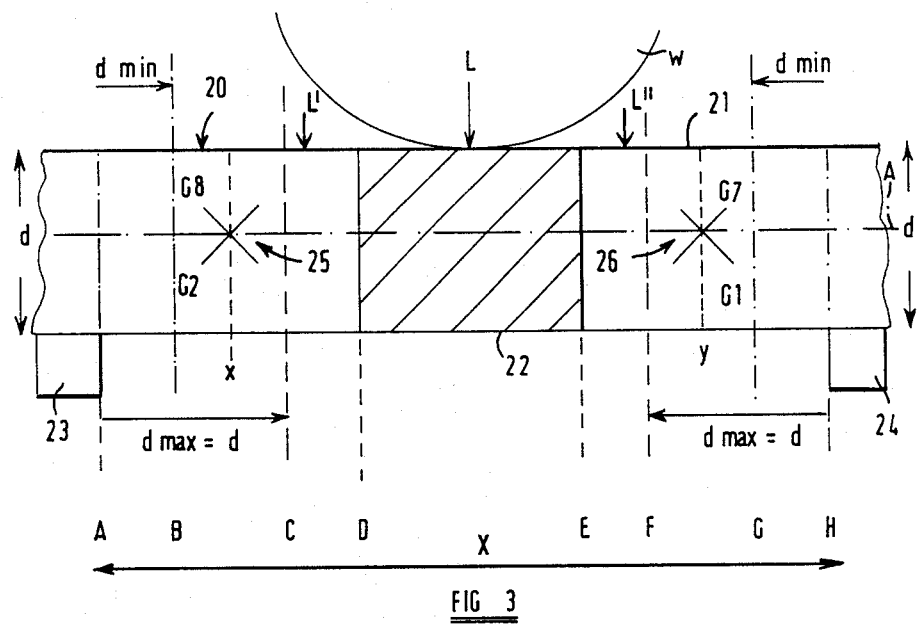
FIG. 3 is a diagram of a weight sensing apparatus in accordance with the first aspect of the invention.
Figure 6:
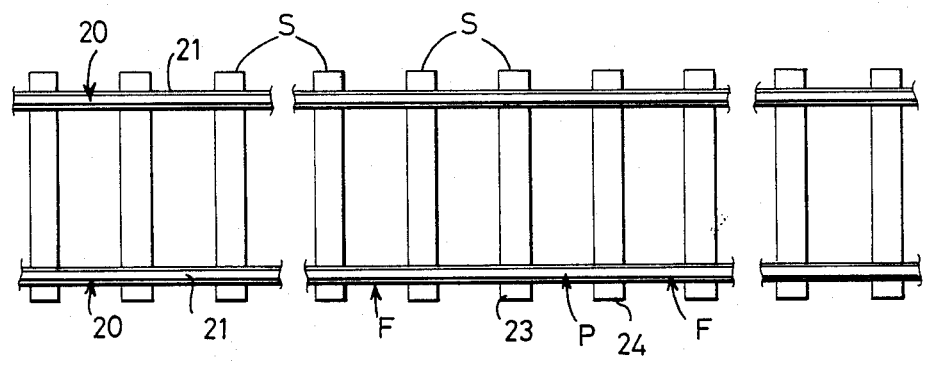
FIG. 6 is a diagrammatic illustration of a railway track embodying the invention.

Referring to FIGS. 3 and 6, a section of a railway track is shown, comprising a rail 20 having a top surface 21 on which, in use, the wheels of a railway guided vehicle run, and a lower surface 22. The rail 20, which may be a length of welded track or a discrete rail joined in conventional manner such as fish plates to another length of rail, is supported by a series of sleepers S. A portion of the rail between a first sleeper 23 which provides a first support means, and a second sleeper 24 which provides a second support means affords a sensing portion P. The remainder of the rail comprises end, further, portion which extend away from the sensing portion beyond the adjacent sleeper 23 or 24.

Typically, the rail 20 has a thickness d of about 150 mm, and the sleepers 23 and 24 are spaced apart by a distance X of approximately 600 mm.

In order to give adequate support to a tracked vehicle as the vehicle moves over the rail 20, it is not possible readily to increase the distance between the sleepers 23 and 24 without increasing the depth d of the rail 20.

In order to sense the weight of a wheel w on the rail 20, a pair of strain gauges 25,26, are provided, on the sensing portion P. Each strain gauge 25 and 26 comprises a strain gauge rosette, having two strain gauge elements.

Strain gauge rosette 25 has two strain gauge elements G2 and G8 arranged transverse to one another, and transverse to the longitudinal axis A of the rail 20, and also transverse to the direction in which the load L is applied.

Similarly, strain gauge rosette 26 has two strain gauge elements G7 and G1 again being arranged transverse to one another, and to the axis A, and to the direction of applied load L.

Hence the strain gauge elements G2, G8, G1 and G7, are arranged to sense shear strains which occur in the rail 20 due to the applied load L.

In accordance with the invention, the strain gauge 25 is positioned from the sleeper 23 a distance not greater than a distance d max. which is equal to the depth d of the rail 20. Further, strain gauge 25 is not positioned closer to sleeper 23 than a distance d min. where d min. is equal to 0.35 d max.

With the dimensions mentioned above, the range in which the strain gauge 25 may be positioned along the rail, so as to be at a distance from sleeper 23 than a distance not greater than d max. but not closer than d min., is shown between the indicator lines B and C, the line B being about 52.5 mm from the line A, which is the edge of the sleeper 23, and the line C being a distance of about 150 mm from line A.

Similarly, the strain gauge 26 may be positioned within the range shown between lines F and G where line F is 150 mm from line H which indicates the edge of sleeper 24 and line G is about 52.5 mm from line H.

With the strain gauges 25 and 26 positioned within these ranges, the load itself may be applied anywhere within a load receiving region that the load L is not applied closer to either of the strain gauges 25 and 26 than a distance equal to d min. i.e. 52.5 mm.

The lines D and E in FIG. 3, show the load receiving region i.e. the permitted range in which the load L may be applied, if the strain gauges 25 and 26 are both positioned at their outermost limits from their respective sleepers 23 and 24 i.e. along lines C and F respectively. In this example, the load may be applied anywhere over a range of 200 mm.

Of course, the strain gauges 25 and 26 can be moved closer to their respective sleepers 23 and 24 which would increase the range over which the load L may be applied.

In the arrangement shown, the strain gauges 25 and 26 are approximately 400 mm apart so that line x which shows the longitudinal position of strain gauge 25 is approximately 100 mm from sleeper 23, whilst line y which shows the longitudinal position of strain gauge 26, is approximately 100 mm from sleeper 24.

Thus the load may be applied anywhere between the lines L' and L" which are each approximately 152.5 mm from the respective sleepers 23 and 24.

Thus it will be appreciated that such an arrangement considerably facilitates the positioning of a wheel w for example to measure a static wheel load of the wheel w between two sleepers 23 and 24, using strain gauges.

Such an arrangement is possible because it has been found that the strain gauges 25 and 26 can be positioned closer to the sleepers 23,24, and the applied load L than hitherto thought possible.

Figure 4:
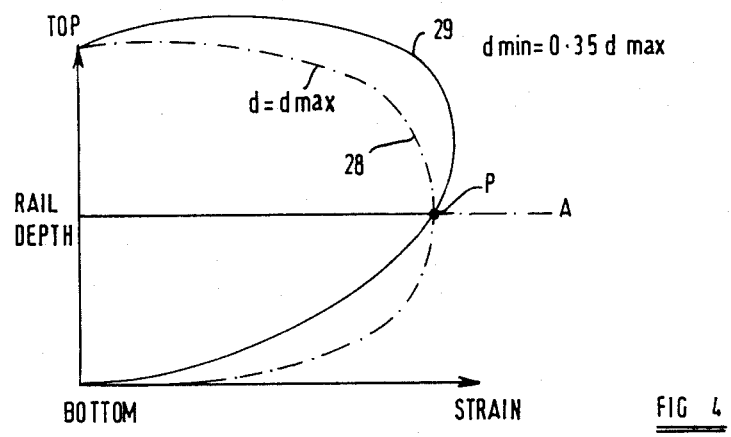
FIG. 4 is a graph showing how shear strain is distributed through the depth of the beam of the apparatus of FIG. 3, for the load in two alternative positions.

Referring to FIG. 4, the distribution of the shear strain though the depth of the rail 20 is shown for the application of the load L at two alternative positions.

In a first extreme position, when the strain gauges 25 and 26 are each at least 150 mm from the applied load, and the strain gauges 25 and 26 are each at least 150 mm from their respective sleepers 23 and 24, i.e. the load L has to be applied at the position L shown, and the strain gauges 25,26, are positioned along lines C,F, the shear strain is symmetrically distributed through the rail 20 as shown by the chain dotted graph 28, in a similar manner to the graph of FIG. 2a.

Where the strain gauges 25 and 26 are positioned closer to their respective sleepers 23 and 24, than 150 mm, for example at 52.5 mm from their respective sleepers 23,24, i.e. along lines B and G respectively, which is about the limit of the ranges in which the strain gauges 25 and 26 can be placed, and the load is applied between the strain gauges 25 and 26 at least 52.5 mm from each of the strain gauges 25 and 26, a graph such as indicated by line 29 will be produced. It can be seen however that at a centre position of the rail 20, i.e. along axis A, that both the graphs 28 and 29 pass through a common point P and accordingly the strain at point P is substantially constant for the strain gauges 25 and 26 and the load L being positioned and applied within the ranges described. Hence, the arrangement shown in FIG. 3 provides a practical weight sensor using strain gauges, for a rail of a track for a tracked vehicle. The actual position of common point P will depend on the shape of the rail cross section, and may not always coincide with the point of maximum shear strain as shown in the figure.

Figure 5:
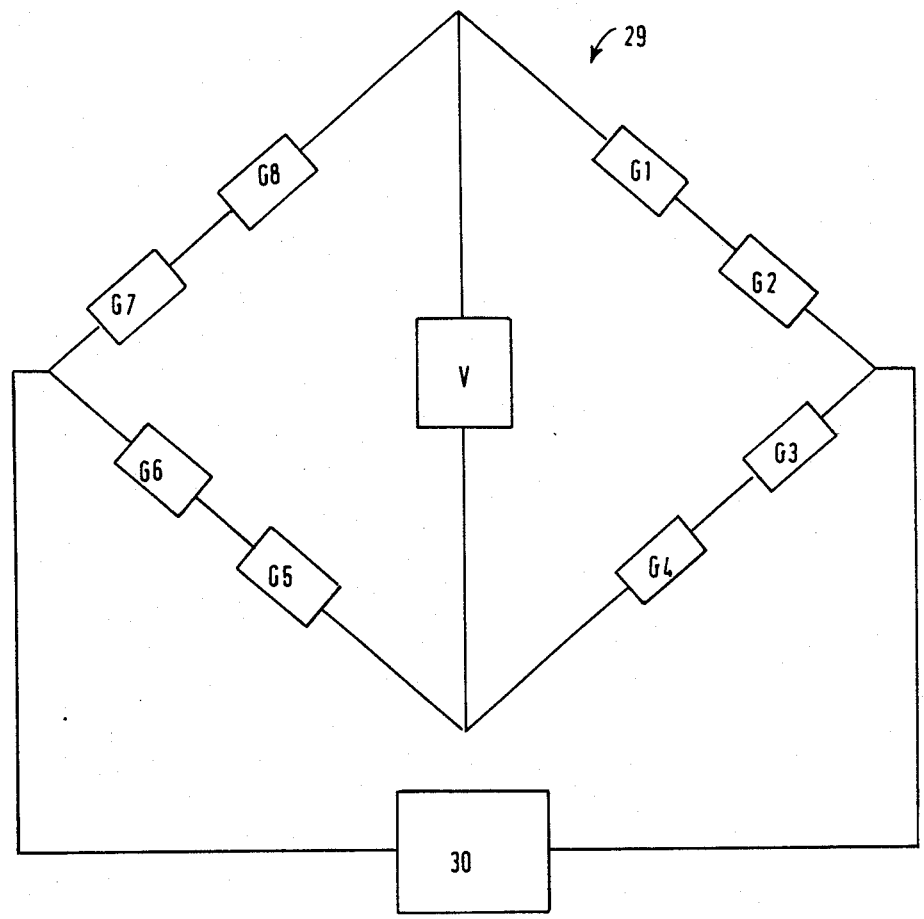
FIG. 5 is an illustration of a typical electric circuit for connection to the strain gauges in the apparatus of FIG. 3.

Referring now to FIG. 5, a typical bridge circuit 29 is shown to which the strain gauge elements G2,G8,G1 and G7 can be connected. In FIG. 3, the outside of rail 20 i shown. To increase the accuracy of the apparatus, for example to accommodate errors caused by rail twist or other extraneous causes, the inside of the rail would also be provided with strain gauge rosettes aligned with the strain gauge rosettes 25 and 26 and also comprising two strain gauge elements, the strain gauge element G3 being aligned with element G7, a strain gauge element G5 being aligned with G1, a strain gauge element G4, being aligned with G8, and a strain gauge element G6 being aligned with G2.

Hence the strain gauge elements G3,G4,G7 and G8, will sense any tension occurring in the rail 20, whilst strain gauge elements G1,G2,G5 and G6 will sense any compression in the rail 20.

By arranging the elements as shown in FIG. 5, in a bridge circuit 29, when a voltage V is applied to the bridge, any change in the strain of the rail 20 can be detected by a control means 30. The control means may for example comprise an analogue to digital converter so that the signals produced can be fed direct to a suitably programmed computing means. Preferably, the resistances of the various arms of the bridge are adjusted so that when no load is applied to the rail 20, the bridge is balanced. In the event of a load being applied, with the strain gauge elements G1 to G8 arranged in a bridge circuit as shown in FIG. 5, only loads applied in the vertical direction such as shown by lines L,L', and L" in FIG. 3, will be detected.

By suitable calibration of the control means 30 and the bridge 29, the actual wheel load of a wheel w passing over the sensing apparatus can be determined.

However, by suitable adaption of the control means 30, the weight sensing apparatus can be used to fulfill other functions. In particular, preferably both rails of a track are provided with four strain gauge rosettes as described for rail 20, the strain gauge rosettes of the rails being displaced relative to one another. By providing suitable logic operators between a bridge circuit for rail 20 and the bridge circuit of the other rail, the system can be used to fulfill each of the following functions.

1. An indication of the direction in which the tracked vehicle is moving.

This is achieved because the control means 30 can be arranged to sense the gradient of the load as an individual wheel of the vehicle passes over the rail section 20.

For a train approaching from one direction, a positive gradient would be obtained, and for the train approaching in an opposite direction a negative gradient would be sensed.

2. The speed of the train can be sensed and a measure of the distance between the consecutive axles can be obtained.

To acheive this, the time taken from the time a wheel load reaches a predetermined value and decreases to a predetermined value, would be sensed. This arrangement would operate where strain gauges are provided on one rail only.

Where strain gauges are displaced and provided on two rails, the average speed may be determined. The distance J between consecutive axles would be given by J equals Va. T where Va is the average speed found by the sensing apparatus on the two rails, and T the time interval between consecutive axles passing the measuring section of one rail and then the other.

By knowing the distance between axles, the type of rail vehicle passing over the rail section 20 can be determined because for axle rolling stock for example where four axles are provided on a bogie, these are much closer together than those of two axle rolling stock.

Various modifications may be made without departing from the scope of the invention. For example, although as described, the strain gauges are resistance type strain gauges which may comprise a length of wire which is stretched and contracts in response to a strain, any other type of strain gauge may be used to detect the shear strain in the rail section in response to an applied load.

Instead of measuring the shear strain, the strain gauge or gauges, may be used to measure other strains occurring.

If desired, a control means may be provided including an analogue to digital converter so that the various signals from the strain gauge elements can be passed directly to a computer for manipulation by the software of the computer to give a desired readout.

Although in the above example the case of railway guided vehicle running on a railway track made of conventional welded track or made of relatively long discrete rails is described, the invention may be applied to a track made of shorter rails for example down to rails spanning between three sleepers any two consecutive sleepers providing a first and second support between which a sensing portion of the rail extends and is provided with strain gauges positioned in relation to the first and second support means as hereinbefore described. A further part or parts of the rail extends away from the sensing portion at one or each end thereof depending on whether the first and second support means are provided by two sleepers of a rail supported by three sleepers or an end pair of sleepers of a rail supported on more than three sleepers or the middle two sleepers of a rail supported on more than three sleepers, respectively.

Figure 7:
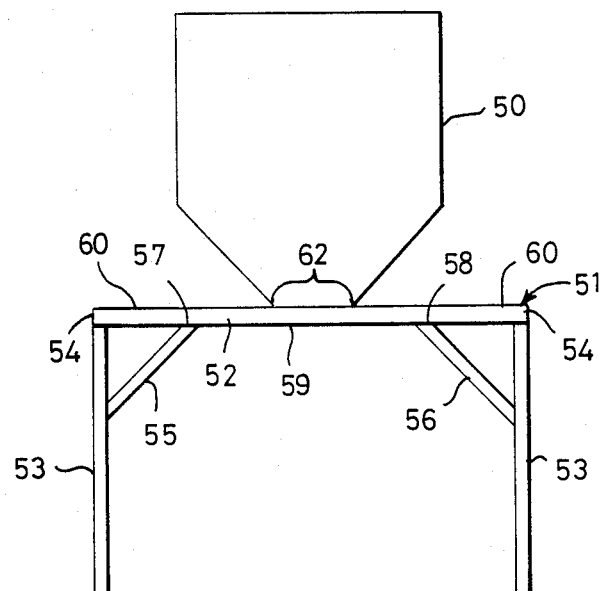
FIG. 7 is a diagrammatic illustration of another embodiment of weight sensing apparatus.

Referring now to FIG. 7 there is illustrated a silo 50 supported on a member 51 which comprises a pair of spaced parallel horizontal beams 52 each of which is supported by vertical legs 53. The legs 53 are connected to the beams 52 at the ends thereof as shown at 54 and strut members 55, 56 which are connected to the beam at 57, 58 respectively. The members 55, 56 comprise first a second support means so that the part of the beams between the positions 57, 58 comprise a sensing portion 59 whilst the remainder of the beams comprise a further portion 60 each of which extends away from the sensing portion beyond an adjacent one of the first and second support means 55, 56 and is connected, as shown at 54, to the legs 53. Strain gauges are positioned on the sensing portion 59 between the first and second support means 55, 56 at positions in relation thereto and in relation to the load receiving region 62 where the load of the silo imposed upon the beams 54 in accordance with the positional constraints described hereinbefore i.e. at positions not greater than d max. and not closer than d min. to at least one of the support means 55, 56 and the load receiving region 62.

If desired the member 51 may be of other construction than a pair of interconnected beams. For example the member 51 could be a platform and could be supported on a different number of legs than the four described hereinbefore.

The invention may be used to provide a weight sensing apparatus to sense the weight of many desired article besides the railway guided vehicle and silo described hereinbefore.

The features disclosed in the foregoing description, or the accompanying drawings, expressed in their specific forms or in terms of a means for performing the disclosed function, or a method or process for attaining the disclosed result, or a class or group of substances or compositions, as appropriate, may, separately or in any combination of such features, be utilised for realising the invention in diverse forms thereof.

I claim:

1. A weight sensing apparatus comprising first and second support means, a load carrying member supported on said first and second support means, a sensing portion of the load carrying member which terminates inwardly of at least one end of the load carrying member and being disposed between said support means and therebeing at least one further portion of the load carrying member which extends away from said sensing portion beyond an adjacent one of said first and second support means toward an end of the load carrying member, a load receiving region provided on said sensing portion, at least one strain gauge positioned on the sensing portion to sense the strain in said member to provide a signal indicative of load applied to the load receiving region, said at least one strain gauge being positioned between the support means at a distance from at least one of the first support means, the second support means and the load receiving region, which is not greater than a distance d max., where d max. is the maximum thickness of the member between the first and second support means in the direction in which the load is to be applied and not closer to a support means or the applied load than a distance of d min., where d min. lies in the range 0.25 to 0.35 d max.

2. Apparatus according to claim 1 wherein the gauge is positioned relative to a respective one of the support means or the applied load at a distance not greater than d max. and not closer than a distance d min. where d min. is substantially 0.35 d max.

3. Apparatus according to claim 1 wherein the or each strain gauge comprises a plurality of strain gauge elements at least some of which are in different orientations to others, to detect strains in the member in different directions.

4. Apparatus according to claim 1 wherein the member comprises a rail, of a track for a railway guided vehicle which spans continuously between and is supported on at least three sleepers and two consecutive sleepers of the track provide the first and second support means.

5. Apparatus according to claim 4, wherein a pair of strain gauges are positioned on each rail, the strain gauges on one rail being displaced longitudinally of the rail relative to the strain gauges on the other rail.

6. A method of sensing the weight of a load to be imposed on a load receiving region of a load carrying member which is supported, in use, on first and second support means, with the load receiving region disposed between said support means, comprising the steps of determining the maximum thickness, d max., of the member between the support means, measuring a distance from at least one of the first support means, the second support means and the load receiving region equal to d max. and positioning a strain gauge on said member between said support means at a distance therefrom which is not greater than said measured distance d max. and not less than d min., where d min. lies in the range 0.25 to 0.35 d max., and connecting the strain gauge in an electrical circuit to provide, in use, an indication of a load applied to the load receiving region.

7. A method according to claim 6 wherein the load carrying member is supported in situ on said first and second support means and the strain gauge is positioned on said member whilst the load carrying member remains in situ.

8. A method according to claim 6 wherein the load is of a railway guided vehicle, and the load carrying member is a rail of a railway track, which spans continuously between and is supported on at least three sleepers, and the first and second support means are provided by consecutive sleepers.

9. A method according to claim 8 including the step of positioning on the second, parallel rail of the track at least one strain gauge.

10. A method according to claim 9 wherein the respective strain gauges of the two rails are displaced relative to one another, longitudinally of the rails.

* * * * *